US006306783B1

United States Patent
Yamanaka

(10) Patent No.: US 6,306,783 B1
(45) Date of Patent: Oct. 23, 2001

(54) TIN BOROPHOSPHATE GLASS COMPRISING SNO, $B_2O_3$, AND $P_2O_5$ AS MAIN COMPONENTS AND SEALING MATERIAL USING THE GLASS

(75) Inventor: Toshio Yamanaka, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/496,522

(22) Filed: Feb. 2, 2000

(51) Int. Cl.[7] .......................... C03C 3/064; C03C 3/066; C03C 3/14; C03C 3/145; C03C 3/19
(52) U.S. Cl. .................... 501/15; 501/17; 501/24; 501/25; 501/26; 501/44; 501/46; 501/47; 501/48; 501/49; 501/52; 501/77; 501/79
(58) Field of Search .................... 501/15, 17, 25, 501/24, 26, 44, 46, 47, 48, 49, 52, 77, 79

(56) References Cited

U.S. PATENT DOCUMENTS

| 4,940,677 | * | 7/1990 | Beall et al. | 501/45 |
| 5,246,890 | * | 9/1993 | Aitken et al. | 501/15 |
| 5,281,560 | * | 1/1994 | Francis et al. | 501/46 |
| 5,328,874 | * | 7/1994 | Beall et al. | 501/45 |
| 5,330,940 | * | 7/1994 | Aitken et al. | 501/47 |

FOREIGN PATENT DOCUMENTS

| 09175833 | * | 7/1997 | (JP) . |
| 11209146 | * | 8/1999 | (JP) . |
| 11292564 | * | 10/1999 | (JP) . |

* cited by examiner

Primary Examiner—David R. Sample

(57) ABSTRACT

A tin borophosphate glass for use in sealing materials includes, by mole, 30 to 80% of SnO, 5 to 60% of $B_2O_3$, and 5 to 24% of $P_2O_5$ as main components. The glass is free of lead but is of equal quality to those of conventional lead-containing sealing glasses. The glass can provide a satisfactory sealing material.

11 Claims, No Drawings

TIN BOROPHOSPHATE GLASS COMPRISING SNO, $B_2O_3$, AND $P_2O_5$ AS MAIN COMPONENTS AND SEALING MATERIAL USING THE GLASS

BACKGROUND OF THE INVENTION

1. Field of the Invention

The present invention relates to a tin borophosphate glass and to a sealing material using the glass.

2. Description of the Related Art

Materials using glasses have been developed as sealing materials for glass, ceramics, metals, and other materials.

To obtain a strong bonding, such a sealing glass must be heated to a sufficiently high temperature to wet the surface of a subject to be sealed in a sealing process. The sealing temperature should be, however, decreased as low as possible in the sealing of electronic parts. Sealing materials are mainly used in such applications and contain a lead-borate low-melting glass. Especially, sealing materials in wide use have a sealing temperature of 430° C. to 500° C. and a thermal expansion coefficient of $70 \times 10^{-7}$/° C. to $100 \times 10^{-7}$/° C.

However, demands have been made in recent years to provide lead-free sealing glasses from the viewpoint of environmental issues.

A tin borophosphate glass has been proposed as such a lead-free sealing glass. This type of glass contains, however, large amounts of $P_2O_5$ as a main glass forming oxide and shows various disadvantages specific to a phosphate glass and has not yet been used in practice. The disadvantages of phosphate glasses include 1) an increased thermal expansion coefficient, 2) a deteriorated mechanical strength as compared with conventional sealing glasses, 3) a deteriorated weatherability, 4) exuding of a remaining matrix glass when crystallized, and 5) vigorous foaming in a glass forming reaction due to a material phosphoric acid.

SUMMARY OF THE INVENTION

It is an object of the invention to provide a lead-free glass of equal quality to conventional sealing glasses.

It is another object of the invention to provide a sealing material using the glass.

Under these circumstances and after intensive investigations, the present inventors found that the above objects can be achieved by restricting the content of $P_2O_5$ to 24% by mole or less and using $B_2O_3$ as a main glass forming oxide instead of $P_2O_5$. The invention has been accomplished based on the above findings.

According to one aspect of the present invention, there is provided a tin borophosphate glass which comprises, by mole, 30 to 80% of SnO, 5 to 60% of $B_2O_3$, and 5 to 24% of $P_2O_5$ as main components.

According to another aspect of the present invention, there is provided a sealing material which includes, by volume, 50 to 100% of a powdered tin borophosphate glass and 0 to 50% of a powdered refractory filler. The powdered tin borophosphate glass contains, by mole, 30 to 80% of SnO, 5 to 60% of $B_2O_3$, and 5 to 24% of $P_2O_5$ as main components.

DESCRIPTION OF THE PREFERRED EMBODIMENT

The invention will now be described in more detail. The term "%" as used herein means "% by mole" unless specifically defined otherwise.

In the invented glass, the contents of main components, SnO, $B_2O_3$, $P_2O_5$ are specified to the above ranges for the following reasons.

SnO serves to lower the melting point of the glass. When the content of SnO is less than 30%, the glass is to have an excessively high viscosity and an excessively high sealing temperature. In contrast, when the content exceeds 80%, the materials cannot be vitrified. The content of SnO preferably ranges from 40% to 65%.

$B_2O_3$ serves as a glass forming oxide. When the content of $B_2O_3$ is less than 5%, the materials cannot be vitrified. In contrast, when the content exceeds 60%, the glass is to have an excessively high viscosity. The content of $B_2O_3$ preferably ranges from 10% to 40%.

$P_2O_5$ serves as a glass forming oxide. When the content of $P_2O_5$ is less than 5%, the materials cannot be vitrified. In contrast, if the content exceeds 24%, a resulting glass significantly exhibits the disadvantages specific to a phosphate glass, such as an excessively increased thermal expansion coefficient. The content of $P_2O_5$ preferably ranges from 10% to 23%.

A molar ratio $B_2O_3/P_2O_5$ is preferably 0.25 or more, and more preferably 0.4 or more. When the molar ratio is less than 0.25, the disadvantages specific to a phosphate glass are liable to occur.

The invented glass can further comprise additional components in addition to the main components. These additional components include, but are not limited to, ZnO, $Al_2O_3$, $SiO_2$, $WO_3$, $MoO_3$, $Nb_2O_5$, $TiO_2$, $ZrO_2$, $R_2O$, CuO, MnO, R'O, and other components for stabilizing glass, where R is Li, Na, K, and/or Cs, and R' is Mg, Ca, Sr, and/or Ba. The total content of the stabilizing components should be preferably 40% or less. This is because, a resulting glass contrarily becomes unstable and is liable to devitrify in molding when the total content exceeds 40%.

The stabilizing components for use in the invention preferably have the following contents for the following reasons.

ZnO serves to stabilize the glass and to lower the thermal expansion coefficient. The content of ZnO is preferably 0 to 25%, and more preferably 0 to 15%. When the content of ZnO exceeds 25%, the glass is liable to crystallize to an excessive extent and the fluidity is thereby deteriorated.

The contents of $Al_2O_3$ and $SiO_2$ are each preferably 0 to 10%, and more preferably 0 to 5%. When each of the contents of these components exceeds 10%, the glass is liable to have an excessively high viscosity.

The contents of $WO_3$ and $MoO_3$ are each preferably 0 to 20%, and more preferably 0 to 10%. When each of these contents exceeds 20%, the glass is liable to have an excessively high viscosity.

$Nb_2O_5$, $TiO_2$ and $ZrO_2$ each preferably have a content of 0 to 15%, and more preferably 0 to 10%. When each of these contents exceeds 15%, the glass is liable to crystallize excessively.

The content of $R_2O$ is preferably 0 to 35%, and more preferably 0 to 15%. If the content of $R_2O$ exceeds 35%, the glass is liable to crystallize excessively.

The contents of CuO and MnO are each preferably 0 to 10%, and more preferably 0 to 5%. When each of these contents exceeds 10%, the glass is liable to become unstable.

The content of R'O is preferably 0 to 15%, and more preferably 0 to 5%. If the content exceeds 15%, the glass is liable to become unstable.

The glass can further comprise $F_2$ to lower the melting point of the glass. In this case, a mole ratio $F_2/(F_2+O_2)$ should preferably be 0.3 or less, and more preferably 0.1 or less. If the ratio $F_2/(F_2+O_2)$ exceeds 0.3, the glass is liable to become unstable.

The glass having the above composition has a glass transition point of 280° C. to 380° C. and shows a satisfactory fluidity at temperatures of 500° C. or lower. The glass has a thermal expansion coefficient of about $90 \times 10^{-7}/°$ C. to about $150 \times 10^{-7}/°$ C. at temperatures ranging from 30° C. to 250° C.

The invented tin borophosphate glass has the above characteristics and can be used alone as a sealing material for materials having a compatible thermal expansion coefficient. In contrast, the glass can be compounded with a powdered refractory filler comprising a low-expansion material and can be used for the sealing of materials not having a compatible thermal expansion coefficient. Such materials not having a compatible thermal expansion coefficient include, for example, alumina ($70 \times 10^{-7}/°$ C.) and a flat window glass ($80 \times 10^{-7}/°$ C). The powdered refractory filler can be also added to improve the mechanical strength, as well as to adjust the thermal expansion coefficient.

In the case a powdered refractory filler is added, the glass should comprise, by volume, 50 to 100% of a powdered glass and 0 to 50% of the powdered filler. When the proportion of the powdered filler exceeds 50% by volume, the proportion of the glass becomes relatively low, and a fluidity required as a sealing material cannot be obtained. Materials of the powdered refractory filler include, but are not limited to, cordierite, zircon, tin oxide, niobium oxide, zirconium phosphate, willemite, mullite, and other materials.

An embodiment of the invention will now be described below.

A sealing material using the invented tin borophosphate glass can be prepared in the following manner. Initially, materials are mixed to have the above composition, and the resulting mixture is molten for vitrification. In the melting process, the oxidation of SnO into $SnO_2$ must be avoided. To this end, the glass is effectively molten or melted in a non-oxidative atmosphere, such as an $N_2$ atmosphere. The molten glass is molded, pulverized and is classified. A powdered refractory filler is added and blended with the powdered glass as necessary to yield a sealing material. The sealing material thus obtained can be used in the following manner, for example.

Initially, the sealing material is applied onto surfaces of subjects to be sealed. The sealing material may be used as a paste in the application. The subjects can be sealed with each other by firing under a sufficient condition for the glass to wet the surfaces of the subjects. The firing is effectively performed in a non-oxidative atmosphere as in the glass forming process.

The invention will be further illustrated in detail with reference to several inventive examples below but these examples are not directed to limiting the scope of the invention.

EXAMPLE 1

Tables 1 to 4 below show an invented example (Sample Nos. 1 to 16).

TABLE 1

| Sample No. | 1 | 2 | 3 | 4 (mol %) |
|---|---|---|---|---|
| SnO | 45.0 | 60.0 | 56.0 | 50.0 |
| $B_2O_3$ | 35.0 | 20.0 | 13.0 | 28.0 |
| $P_2O_5$ | 10.0 | 19.0 | 22.0 | 20.0 |
| ZnO | — | — | 9.0 | — |
| $Al_2O_3$ | — | 1.0 | — | 2.0 |
| remainder | — | — | — | — |
| $B_2O_3/P_2O_5$ | 3.50 | 1.05 | 0.59 | 1.40 |
| Melting temperature (° C.) | 900 | 800 | 900 | 900 |
| Melting atmosphere | $N_2$ | air | air | air |
| Firing temperature (° C.) | 500 | 480 | 480 | 500 |
| Firing atmosphere | $N_2$ | $N_2$ | air | $N_2$ |
| Glass transition point (° C.) | 338 | 345 | 349 | 360 |
| Thermal expansion coefficient ($\times 10^{-7}/°$ C.) | 98 | 103 | 98 | 94 |
| Flow button diameter (mm) | 26.0 | 25.0 | 24.5 | 22.5 |

TABLE 2

| Sample No. | 5 | 6 | 7 | 8 (mol %) |
|---|---|---|---|---|
| SnO | 49.6 | 49.6 | 50.0 | 51.0 |
| $B_2O_3$ | 11.9 | 11.9 | 25.0 | 29.0 |
| $P_2O_5$ | 20.2 | 20.2 | 20.0 | 17.0 |
| ZnO | 10.0 | 10.0 | — | — |
| $Al_2O_3$ | — | 3.0 | — | — |
| remainder | $WO_3$ | $MoO_3$ | $TiO_2$ | $ZrO_2$ |
|  | 8.3 | 5.3 | 5.0 | 3.0 |
| $B_2O_3/P_2O_5$ | 0.59 | 0.59 | 1.25 | 1.71 |
| Melting temperature (° C.) | 1000 | 1000 | 1000 | 900 |
| Melting atmosphere | $N_2$ | air | $N_2$ | $N_2$ |
| Firing temperature (° C.) | 500 | 500 | 480 | 480 |
| Firing atmosphere | $N_2$ | $N_2$ | $N_2$ | $N_2$ |
| Glass transition point (° C.) | 355 | 352 | 358 | 360 |
| Thermal expansion coefficient ($\times 10^{-7}/°$ C.) | 101 | 103 | 98 | 97 |
| Flow button diameter (mm) | 22.0 | 22.2 | 22.0 | 23.2 |

TABLE 3

| Sample No. | 9 | 10 | 11 | 12 (mol %) |
|---|---|---|---|---|
| SnO | 45.0 | 55.0 | 54.0 | 55.0 |
| $B_2O_3$ | 26.0 | 20.0 | 13.0 | 13.0 |
| $P_2O_5$ | 19.0 | 20.0 | 22.0 | 21.0 |
| ZnO | — | — | 8.0 | 8.0 |
| $Al_2O_3$ | — | — | — | — |
| remainder | $Li_2O$ | $Cs_2O$ | CuO | MnO |
|  | 10.0 | 5.0 | 3.0 | 3.0 |
| $B_2O_3/P_2O_5$ | 1.37 | 1.00 | 0.59 | 0.62 |
| Melting temperature (° C.) | 950 | 950 | 1000 | 1000 |
| Melting atmosphere | $N_2$ | $N_2$ | $N_2$ | $N_2$ |
| Firing temperature (° C.) | 480 | 480 | 500 | 480 |
| Firing atmosphere | $N_2$ | $N_2$ | $N_2$ | $N_2$ |
| Glass transition point (° C.) | 352 | 348 | 341 | 340 |
| Thermal expansion coefficient ($\times 10^{-7}/°$ C.) | 102 | 105 | 96 | 95 |
| Flow button diameter (mm) | 22.5 | 23.8 | 22.0 | 22.0 |

TABLE 4

| Sample No. | 13 | 14 | 15 | 16 (mol %) |
|---|---|---|---|---|
| SnO | 48.0 | 48.0 | 50.0 | 40.0 |
| $B_2O_3$ | 25.0 | 28.0 | 18.0 | 25.0 |
| $P_2O_5$ | 22.0 | 22.0 | 22.0 | 20.0 |
| ZnO | — | — | 5.0 | 5.0 |

TABLE 4-continued

| Sample No. | 13 | 14 | 15 | 16 (mol %) |
|---|---|---|---|---|
| $Al_2O_3$ | — | — | — | — |
| remainder | MgO | $SiO_2$ | $Nb_2O_5$ | $SnF_2$ |
|  | 5.0 | 2.0 | 5.0 | 10.0 |
| $B_2O_3/P_2O_5$ | 1.14 | 1.27 | 0.82 | 1.25 |
| $F_2/(F_2 + O_2)$ | — | — | — | 0.08 |
| Melting temperature (° C.) | 950 | 950 | 850 | 800 |
| Melting atmosphere | $N_2$ | $N_2$ | air | air |
| Firing temperature (° C.) | 480 | 480 | 480 | 450 |
| Firing atmosphere | $N_2$ | $N_2$ | air | air |
| Glass transition point (° C.) | 358 | 356 | 351 | 320 |
| Thermal expansion coefficient ($\times 10^{-7}/°$ C.) | 92 | 96 | 93 | 105 |
| Flow button diameter (mm) | 22.5 | 22.3 | 22.0 | 23.0 |

Each sample was prepared in the following manner. Initially, materials were mixed to have a composition indicated in the tables. The resulting mixture was molten at 800° C. to 1000° C. in an air or $N_2$ atmosphere for 1 to 2 hours. The molten glass was passed through between water-cooled rollers and was molded into a thin plate. The plate glass was then pulverized with a ball mill and was passed through a sieve of 105 μm opening to yield a sample. The sample comprised a powdered glass having a mean particle diameter of about 10 μm.

Each sample was then evaluated in glass transition point, thermal expansion coefficient, and fluidity. Each of Sample Nos. 1 to 16 as invented examples had a glass transition point of 320° C. to 360° C. and a thermal expansion coefficient of $92 \times 10^{-7}/°$ C. to $105 \times 10^{-7}/°$ C. at temperatures ranging from 30° C. to 250° C. Each of the samples had a satisfactory fluidity of a flow button diameter of 22.0 to 26.0 mm.

The glass transition point was determined by differential thermal analysis (DTA), and the thermal expansion coefficient was measured with a push-rod type dilatometer. The fluidity was evaluated in the following manner. A powdered glass in a weight corresponding to the true specific gravity of the glass was press-molded in a die into a button shape having an outer diameter of 20 mm. The button was then placed on a flat window glass, was heated to a firing temperature indicated in the tables at a rate of 10° C./minute and was maintained at the firing temperature for 10 minutes. The diameter of the resulting fluidized button was determined as a flow button diameter.

EXAMPLE 2

A sealing material was prepared by mixing 75% by volume of a powdered glass and 25% by volume of a powdered cordierite. The powered glass was the sample No. 1 prepared in Example 1.

The material was evaluated in thermal expansion coefficient and fluidity in the same manner as in Example 1. As a result, the sealing material had a thermal expansion coefficient of $75 \times 10^{-7}/°$ C. at temperatures ranging from 30° C. to 250° C. This range of the thermal expansion coefficient is suitable for sealing flat window glasses. The material had a flow button diameter of 23.0 mm and indicated a satisfactory fluidity.

The used powdered cordierite was prepared in the following manner. A glass having a stoichiometric composition ($2MgO \cdot 2Al_2O_3 \cdot 5SiO_2$) was pulverized and was passed trough a sieve of 105 μm opening. The obtained powdered glass was then heated at a temperature of 1350° C. for 10 hours to yield a crystallized product. The crystallized product was pulverized and was passed through a sieve of 45 μm opening to yield a powdered cordierite.

As thus described, the invented tin borophosphate glass has a glass transition point of 280° C. to 380° C. and exhibits a satisfactory fluidity at temperatures of 500° C. or lower. The glass has no disadvantages specific to phosphate glasses and can yield lead-free sealing materials of equal quality to conventional ones. The glass can be employed for a variety of uses, such as materials for the formation of barrier ribs of a plasma display panel (PDP), in addition to use in sealing.

The invented sealing material can be sealed at low temperatures and can be adjusted to any of desired thermal expansion coefficients matching to those of various materials with the use of filler. The invented sealing material can be therefore advantageously used as an alternative to lead-containing sealing materials used in electronic parts such as magnetic heads, cathode ray tubes (CRTs), plasma display panels (PDPs) and vacuum fluorescent displays (VFDs).

Other embodiments and variations will be obvious to those skilled in the art, and this invention is not to be limited to the specific matters stated above.

What is claimed is:

1. A tin borophosphate glass comprising, by mole, 30 to 80% of SnO, 5 to 60% of $B_2O_3$, and 5 to 24% $P_2O_5$ as main components and 0 to 25% ZnO as a stabilizing component.

2. A tin borophosphate glass according to claim 1, wherein a molar ratio $B_2O_3/P_2O_5$ is 0.25 or more in said tin borophosphate glass.

3. A tin borophosphate glass according to claim 1, wherein said tin borophosphate glass comprises a total of 40% or less of at least one stabilizing component selected from the group consisting of ZnO, $Al_2O_3$, $SiO_2$, $WO_3$, $MoO_3$, $Nb_2O_5$, $TiO_2$, $ZrO_2$, $R_2O$, CuO, MnO, and R'O, where R is at least one of Li, Na, K, and Cs, and R' is at least one of Mg, Ca, Sr, and Ba.

4. A tin borophosphate glass according to claim 3, wherein said stabilizing component in the tin borophosphate glass comprises, by mole, 0 to 10% of $Al_2O_3$, 0 to 10% of $SiO_2$, 0 to 20% of $WO_3$, 0 to 20% of $MoO_3$, 0 to 15% of $Nb_2O_5$, 0 to 15% of $TiO_2$, 0 to 15% of $ZrO_2$, 0 to 35% of $R_2O$, 0 to 10% of CuO, 0 to 10% of MnO, and 0 to 15% of R'O.

5. A tin borophosphate glass according to claim 1, wherein said tin borophosphate glass further comprises $F_2$ in a molar ratio $F_2/(F_2+O_2)$ of 0.3 or less.

6. A sealing material comprising, by volume, 50 to 100% of a powdered tin borophosphate glass and 0 to 50% of a powdered refractory filler, said powdered tin borophosphate glass comprising, by mole, 30 to 80% of SnO, 5 to 60% $B_2O_3$, and 5 to 24% of $P_2O_5$, and 0 to 25% ZnO as a stabilizing component.

7. A sealing material according to claim 6, wherein a molar ratio $B_2O_3/P_2O_5$ is 0.25 or more in said powdered tin borophosphate glass.

8. A sealing material according to claim 6, wherein said powdered tin borophosphate glass comprises a total of 40% or less of at least one stabilizing component selected from the group consisting of ZnO, $Al_2O_3$, $SiO_2$, $WO_3$, $MoO_3$, $Nb_2O_5$, TiO2, $ZrO_2$, $R_2O$, CuO, MnO, and R'O, where R is at least one of Li, Na, K, and Cs, and R' is at least one of Mg, Ca, Sr, and Ba.

9. A sealing material according to claim 8, wherein said stabilizing component in the powdered tin borophosphate glass comprises, by mole, 0 to 10% of $Al_2O_3$, 0 to 10% of $SiO_2$, 0 to 20% of $WO_3$, 0 to 20% of $MoO_3$, 0 to 15% of $Nb_2O_5$, 0 to 15% of $TiO_2$, 0 to 15% of $ZrO_2$, 0 to 35% of $R_2O$, 0 to 10% of CuO, 0 to 10% of MnO, and 0 to 15% of R'O.

10. A sealing material according to claim 6, wherein said powdered tin borophosphate glass further comprises $F_2$ in a molar ratio $F_2/(F_2+O_2)$ of 0.3 or less.

11. A sealing material according to claim 6, wherein said powdered refractory filler comprises cordierite.

* * * * *